US009623982B2

(12) United States Patent
Sharma

(10) Patent No.: US 9,623,982 B2
(45) Date of Patent: Apr. 18, 2017

(54) ON-BOARD AIRCRAFT NITROGEN ENRICHED AIR AND COOLING FLUID GENERATION SYSTEM AND METHOD

(71) Applicant: AIRBUS GROUP INDIA PRIVATE LIMITED, Bangalore (IN)

(72) Inventor: Anurag Sharma, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 10 days.

(21) Appl. No.: 14/949,916

(22) Filed: Nov. 24, 2015

(65) Prior Publication Data

US 2016/0200446 A1 Jul. 14, 2016

(30) Foreign Application Priority Data

Jan. 8, 2015 (IN) .............................. 140/CHE/2015

(51) Int. Cl.
*B01D 53/22* (2006.01)
*B64D 37/32* (2006.01)
(Continued)

(52) U.S. Cl.
CPC ........... *B64D 37/32* (2013.01); *B01D 53/227* (2013.01); *B64D 13/08* (2013.01); *F25J 1/005* (2013.01); *F25J 1/0015* (2013.01); *F25J 1/0052* (2013.01); *F25J 1/0062* (2013.01); *F25J 1/0065* (2013.01); *F25J 1/0204* (2013.01); *F25J 1/0275* (2013.01); *B01D 2259/4575* (2013.01); *F25J 2205/80* (2013.01); *F25J 2210/40* (2013.01);
(Continued)

(58) Field of Classification Search
CPC .. B01D 53/225; B01D 53/229; B01D 53/227; B01D 53/22; B01D 2259/4575; B64D 13/02; B64D 13/06; B64D 13/08; B64D 2013/0677; B64D 37/30; B64D 37/20; Y02T 50/44; F25J 1/0015; F25J 1/0017; F25J 1/055; F25J 1/0052; F25J 1/0062; F25J 1/0065; F25J 1/0204; F25J 1/0275; F25J 2205/40; F25J 2205/60; F25J 2210/40; F25J 2270/12; F25J 2270/14; F25J 2270/30; F25J 3/0257; F25J 3/04018; F25J 3/04278; F25J 3/04636; F25J 3/04993
USPC ....... 96/4, 7, 8, 10; 95/8, 11, 43, 45, 57, 65; 62/600; 244/129.2, 135 R
See application file for complete search history.

(56) References Cited

U.S. PATENT DOCUMENTS 4,681,602 A * 7/1987 Glenn .................... B64D 37/32
128/204.29
5,979,440 A * 11/1999 Honkonen ........... B01D 5/0039
128/200.24
(Continued)

*Primary Examiner* — Frank Lawrence
(74) *Attorney, Agent, or Firm* — Prakash Nama; Global IP Services, PLLC

(57) ABSTRACT

An on-board aircraft nitrogen enriched air and cooling fluid generation system and method are disclosed. In one embodiment, the system includes a first heat exchanger which is configured to receive pressurized air from a source of pressurized air. Further, the first heat exchanger cools the pressurized air to a temperature in the range of −120° C. to −70° C. Furthermore, the system includes a separation unit is configured and dimensioned to communicate with the first heat exchanger. The separation unit generates nitrogen enriched air from the cooled air at the temperature range of −120° C. and −70° C.

15 Claims, 2 Drawing Sheets

(51) Int. Cl.
*B64D 13/08* (2006.01)
*F25J 1/00* (2006.01)
*F25J 1/02* (2006.01)

(52) U.S. Cl.
CPC ........ *F25J 2220/40* (2013.01); *F25J 2220/44* (2013.01); *F25J 2260/44* (2013.01)

(56) References Cited

U.S. PATENT DOCUMENTS

| | | | |
|---|---|---|---|
| 8,778,062 B1* | 7/2014 | Snow, Jr. | B64D 37/00 95/1 |
| 2004/0226438 A1* | 11/2004 | Jones | B01D 53/22 95/45 |
| 2005/0279208 A1* | 12/2005 | Schwalm | B01D 53/22 96/4 |
| 2014/0116249 A1* | 5/2014 | Evosevich | B01D 63/02 95/47 |

* cited by examiner

ON-BOARD AIRCRAFT NITROGEN ENRICHED AIR AND COOLING FLUID GENERATION SYSTEM AND METHOD

Benefit is claimed under 35 U.S.C. 119(a)-(d) to Foreign application Serial No. 140/CHE/2015 filed in India entitled "ON-BOARD AIRCRAFT NITROGEN ENRICHED AIR AND COOLING FLUID GENERATION SYSTEM AND METHOD", filed on Jan. 8, 2015, by AIRBUS GROUP INDIA PRIVATE LIMITED, which is herein incorporated in its entirety by reference for all purposes.

TECHNICAL FIELD

Embodiments of the present subject matter generally relate to generation of nitrogen enriched air and more particularly, to an on-board aircraft nitrogen enriched air and cooling fluid generation system and method.

BACKGROUND

Typically, in aircrafts, there is a need to provide an inert gas (e.g., nitrogen) for filling void spaces in fuel tanks, aircraft cargo bay and the like. For example, inert gas is provided to reduce flammability and also to maintain a required pressure in the fuel tanks. Conventional on-board nitrogen generation systems may generate nitrogen enriched air in the aircrafts using engine bleed air, cabin air and/or ram air. Further, the nitrogen enriched air is generated in gaseous form and may require significantly large storage containers to store the generated nitrogen enriched air based on demand of on-board systems in the aircrafts.

SUMMARY

An on-board aircraft nitrogen enriched air and cooling fluid generation system and method are disclosed. According to one aspect of the present subject matter, the system includes a first heat exchanger which is configured to receive pressurized air from a source of pressurized air (e.g., bleed air, cabin air and ram air). Further, the first heat exchanger cools the pressurized air to a temperature in the range of $-120°$ C. to $-70°$ C. Furthermore, the system includes a separation unit is configured and dimensioned to communicate with the first heat exchanger. The separation unit generates nitrogen enriched air from the cooled air at the temperature range of $-120°$ C. and $-70°$ C. In addition, a second heat exchanger is coupled to the separation unit to liquefy at least a portion of the generated nitrogen enriched air by cooling the portion of the generated nitrogen enriched air to a temperature in the range of $-210°$ C. to $-195°$ C. Also, the liquefied portion of the nitrogen enriched air is stored in a nitrogen storage container.

According to another aspect of the present subject matter, pressurized air is fed into a first heat exchanger to cool the pressurized air to a temperature in the range of $-120°$ C. to $-70°$ C. Further, the cooled air at the temperature range of $-120°$ C. and $-70°$ C. is fed into a separation unit. Furthermore, nitrogen enriched air is generated from the cooled air. In addition, at least a portion of the generated nitrogen enriched air is liquefied by cooling the portion of the generated nitrogen enriched air to a temperature in the range of $-210°$ C. to $-195°$ C. in a second heat exchanger. In addition, the liquefied portion of the nitrogen enriched air is stored in a nitrogen storage container.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

Figure 1:
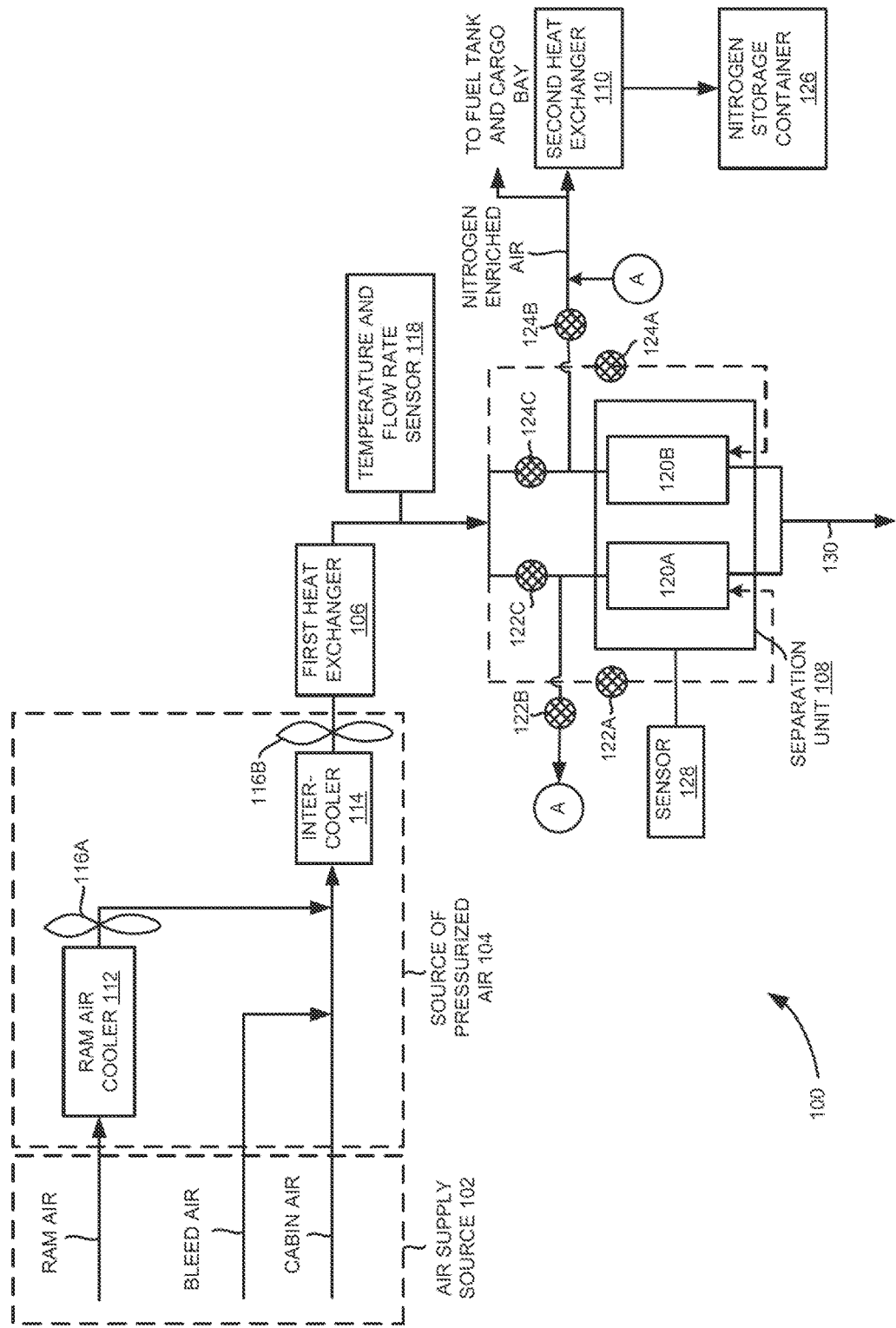
FIG. 1 illustrates an exemplary on-board aircraft system for generating nitrogen enriched air, according to one embodiment.

The drawings described herein are for illustration purposes only and are not intended to limit the scope of the present disclosure in any way.

DETAILED DESCRIPTION

An on-board aircraft nitrogen enriched air and cooling fluid generation system and method are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Conventional on-board nitrogen generation systems generate nitrogen enriched air using engine bleed air, cabin air and/or ram air. The on-board nitrogen generation systems include a conditioning system for conditioning (e.g., reducing temperature, pressure and moisture) the engine bleed air before supplying to nitrogen separation packs for generating the nitrogen enriched air. This conditioning system may have weight implications on the aircraft.

Further, the on-board nitrogen generation systems are generally over-sized due to large demand variations during different phases of flight. For example, peak demands may occur during aircraft start-up, aircraft take-off, aircraft descent and the like and the aircraft may have minimum demand on operating time before pushback. Therefore, the on-board nitrogen generation systems may not be energy and weight optimized. Further, the nitrogen enriched air is generated in gaseous form and may require significantly large storage containers to store the generated nitrogen enriched air based on demand of on-board systems in the aircrafts.

The example technique disclosed herein proposes an on-board aircraft nitrogen enriched air generation and cooling fluid generation system and method. In one example, the system includes a first heat exchanger to receive pressurized air from a source of pressurized air (e.g., bleed air, cabin air and ram air). Further, the first heat exchanger cools the pressurized air to a temperature in the range of $-120°$ C. to $-70°$ C. Furthermore, a separation unit is coupled to the first heat exchanger to generate nitrogen enriched air from the cooled air. In addition, a second heat exchanger is coupled to the separation unit to liquefy at least a portion of the generated nitrogen enriched air by cooling the portion of the generated nitrogen enriched air to a temperature in the range of −210° C. to −195° C. The liquefied portion of the nitrogen enriched air is then stored in a nitrogen storage container (e.g., light weight cryogenic storage). This technique eliminates the need to use engine bleed air and therefore eliminates use of a separate conditioning system which reduces weight of the nitrogen generation system and also energy spent in conditioning the engine bleed air is saved. Further, this technique eliminates the use of large storage system for storing nitrogen enriched air in gaseous form. Therefore, the on-board aircraft nitrogen enriched air generation system is weight and energy optimized.

Referring now to FIG. 1, which illustrates an exemplary on-board aircraft system 100 for generating nitrogen enriched air, according to one embodiment. As shown in FIG. 1, the on-board aircraft system 100 includes an air supply source 102, a source of pressurized air 104, a first heat exchanger 106, a separation unit 108 and a second heat exchanger 110. Further as shown in FIG. 1, the source of pressurized air 104 is coupled between the air supply source 102 and the first heat exchanger 106. Furthermore as shown in FIG. 1, the separation unit 108 is coupled between the first heat exchanger 106 and the second heat exchanger 110.

In the example illustrated in FIG. 1, the air supply source 102 includes ram air, bleed air and/or cabin air. In one example, air conditioning system in an aircraft conditions (e.g., reduces temperature, pressure and moisture levels) engine bleed air and supplies the conditioned air to the source of pressurized air 104. Further, the cabin air refers to air obtained from aircraft cabin. Furthermore, ram air refers to airflow created by motion of the aircraft.

Further as shown in FIG. 1, the source of pressurized air 104 includes a ram air cooler 112, an inter-cooler 114 and compressors 116 A and 116B (e.g., centrifugal/axial compressors that are driven by electric power). In addition as shown in FIG. 1, the ram air cooler 112 is coupled to the inter-cooler 114 via the compressor 116A. In one embodiment, the air supply source 102 provides one or more of the ram air, the bleed air and the cabin air to the source of pressurized air 104. In one example, when the air supply source 102 provides ram air to the source of pressurized air 104, then the ram air cooler 112 cools the ram air which may be at a high temperature. Further, the compressor 116A compresses the cooled ram air to increase pressure of the cooled ram air. Furthermore, the inter-cooler 114 cools the pressurized ram air to further reduce the temperature. In another example, when the air supply source 102 provides bleed air and/or cabin air to the source of pressurized air 104, then the bleed air and/or cabin air is provided to the inter-cooler 114.

Further, the inter-cooler 114 cools the bleed air and the cabin air to further reduce the temperature. In addition, the compressor 116B compresses the pressurized ram air, the bleed air and/or the cabin air to generate pressurized air to supply to the first heat exchanger 106.

Further in operation, the first heat exchanger 106 receives the pressurized air from the source of pressurized air 104. For example, the first heat exchanger 106 can be a liquid helium heat exchanger, a neon heat exchanger and the like. Furthermore, the first heat exchanger 106 cools the pressurized air to a temperature in the range of −120° C. to −70° C. For example, air cooling technique used in the first heat exchanger 106 is a reverse brayton cycle. The first heat exchanger 106 may also separate moisture from the pressurized air. The cooled air in the temperature range of −120° C. to −70° C. is in a near liquid state. In another example, the first heat exchanger 106 may be bypassed when using the cabin air at inlet to a zeolite adsorbent bed separator which works at normal temperature. In this case, only moisture removal is required before reutilizing the cabin outlet air.

In addition in operation, a temperature and flow rate sensor 118 determines temperature and flow rate of the cooled air generated by the first heat exchanger 106. In one example, if it is determined that the temperature of the cooled air is not within the range of −120° C. to −70° C. the operation of the first heat exchanger 106 may be modified suitably, such that the temperature of the cooled air falls within the range. Similarly, if it is determined that the flow rate of the cooled air is not within the desired limit, the operation of the first heat exchanger 106 may be modified suitably.

Moreover in operation, the cooled air is fed to the separation unit 108. In the example illustrated in FIG. 1, the separation unit 108 includes separation membranes 120A and 120B. Exemplary separation membranes include low temperature ceramic separation membranes, gas chromatographic separation membranes, perovskite separation membranes, zeolite separation membranes and the like. In one example, one of the separation membranes 120A and 120B binds byproducts (e.g., oxygen) and lets nitrogen pass to generate nitrogen enriched air when the cooled air is passed in one direction while the other separation membrane releases/purges the byproducts when cooled air is passed in the opposite direction.

In a first operating state, a control valve 122A is open and control valve 124A is closed so that the cooled air generated by the first heat exchanger 106 passes through the separation membrane 120A. Further, control valve 124B is closed, control valve 122B is open and control valve 122C is closed. In this operating state, the separation membrane 120A binds byproducts (e.g., oxygen) and lets the nitrogen pass to generate nitrogen enriched air. Also, control valve 122B is open so that the generated nitrogen enriched air is sent to fuel tank and cargo bay and/or the second heat exchanger 110. Furthermore, control valve 124C is open so that cooled air passes through the separation membrane 120B in the reverse direction. The separation membrane 120B uses the cooled air to release/purge the byproducts that are adsorbed in the previous cycle (as indicated by arrow 130).

Further in the first operating state, a sensor 128 coupled to the separation unit 108 measures oxygen content in the generated nitrogen enriched air. Further, when the said oxygen content from the separation membrane 120A raises above a predetermined threshold value, reverses operation of the separation membranes 120A and 120B to a second operating state. In an example, when the separation membrane 120A is saturated with the adsorbed byproducts, capability of the separation membrane 120A to bind byproducts will decrease. As a result, the content of oxygen in the nitrogen enriched air will increase and therefore content of nitrogen in the nitrogen enriched air will drop. Therefore, the operation of the separation membranes 120A and 120B are reversed to the second operating state to release/purge the binded byproducts in the separation membrane 120A.

In the second operating state, the control valve 122A is closed and control valve 124A is open so that the cooled air passes through the separation membrane 120B. Further, control valve 122B is closed, control valve 124B is open and the control valve 124C is closed. In this operating state, the separation membrane 120B binds byproducts and lets the nitrogen pass to generate nitrogen enriched air. Also, control valve 124B is open so that generated nitrogen enriched air is sent to fuel tank and cargo bay and/or the second heat exchanger 110. Furthermore, control valve 122C is open so that cooled air passes through the separation membrane 120A in reverse direction. The separation membrane 120A uses the cooled air to release/purge the byproducts binded as shown by arrow 130 (e.g., in the first operating state)

Further in the first and second operating states, a portion of the generated nitrogen enriched air is sent to the second heat exchanger 110. For example, the second heat exchanger 110 is a liquid helium heat exchanger, a neon heat exchanger and the like. The second heat exchanger 110 liquefies the portion of the nitrogen enriched air by cooling the portion of the nitrogen enriched air to a temperature in the range of −210° C. to −195° C. The liquefied portion of the nitrogen enriched air is then stored in nitrogen storage container 126. Exemplary nitrogen storage container includes light weight cryogenic storage containers. The liquefied nitrogen may be used for cooling needs in the aircraft, such as avionic cooling, carbon brake disc cooling, secondary cooling system (SES) and the like.

Furthermore, the remaining portion of the generated nitrogen enriched air is utilized in fuel tanks, cargo bay and the like to reduce flammability. The nitrogen enriched air may also be used in the fuel tanks to maintain a predetermined pressure.

Figure 2:
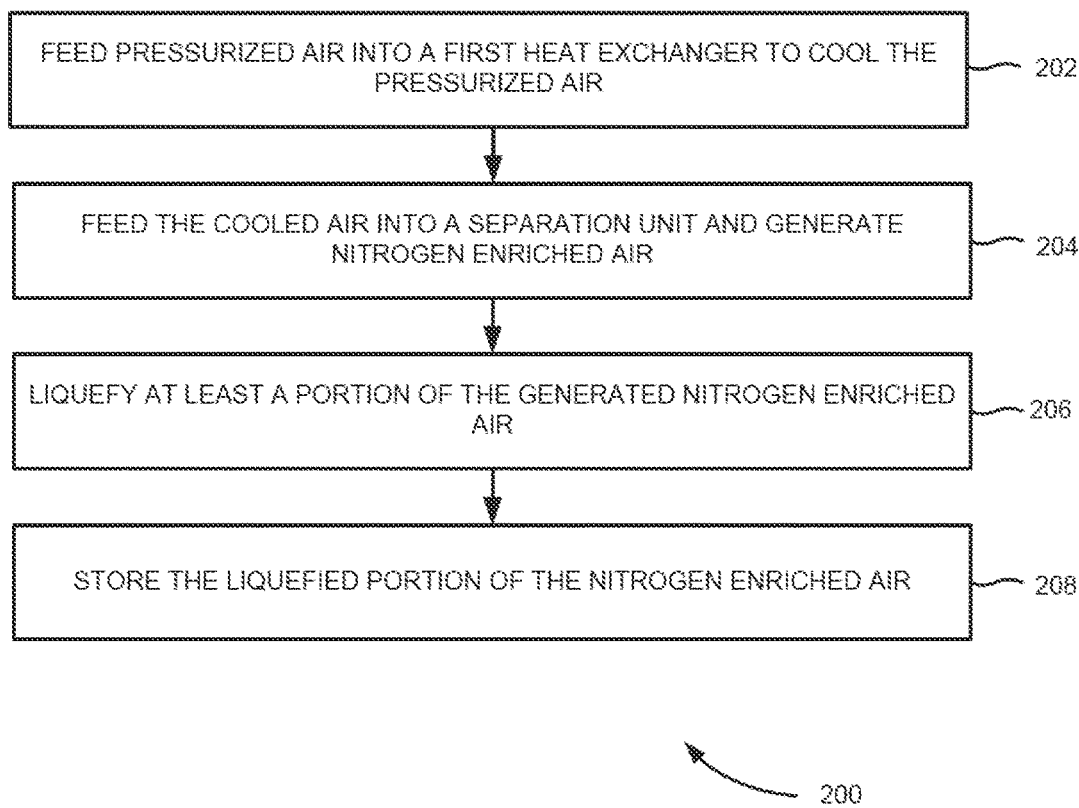
FIG. 2 is a flow diagram illustrating an exemplary method for generating nitrogen enriched air on-board an aircraft, according to one embodiment.

Referring now to FIG. 2, which is a flow diagram 200 illustrating an exemplary method for generating nitrogen enriched air on-board an aircraft, according to one embodiment. At block 202, pressurized air is fed into a first heat exchanger to cool the pressurized air to a temperature in the range of about −120° C. to −70° C. Exemplary first heat exchanger includes a liquid helium heat exchanger, a neon heat exchanger and the like. In one example, the pressurized air is generated from air supplied from an air supply source. The air supply source includes any one or combination of cabin air, bleed air, ram air and the like.

At block 204, the cooled air at the temperature range of about −120° C. and −70° C. is fed into a separation unit and nitrogen enriched air is generated from the cooled air. In one example, the separation unit includes at least two separation membranes. Exemplary separation membranes include low temperature ceramic separation membranes, gas chromatographic separation membranes, perovskite separation membranes, zeolite separation membranes and the like.

In one embodiment, byproducts are binded and nitrogen is let to pass in one of the at least two separation membranes to generate nitrogen enriched air, while the byproducts are purged using the cooled air in other separation membrane of the at least two separation membranes. Further, oxygen content is measured in the generated nitrogen enriched air using a sensor. Furthermore, operation of the at least two separation membranes is reversed when said oxygen content in the generated nitrogen enriched air raises above a predetermined threshold value.

At block 206, at least a portion of the generated nitrogen enriched air is liquefied by cooling the portion of the generated nitrogen enriched air to a temperature in the range of about −210° C. to −195° C. in a second heat exchanger. Exemplary second heat exchanger includes a liquid helium heat exchanger, a neon heat exchanger and the like. At block 208, the liquefied portion of the nitrogen enriched air is stored in a nitrogen storage container.

In various embodiments, the technique described in FIGS. 1 through 2 proposes an on-board aircraft nitrogen enriched air generation system and method. The proposed technique enables to reduce system size and storage weight. Further, ram air can be used instead of engine bleed air in bleedless aircrafts. Furthermore, the liquid nitrogen is safer compared to bottled nitrogen in explosive situations due to much lower pressures and volumes. The weight of the liquid nitrogen is lesser compared to high pressure bottled nitrogen gas. In addition, availability of liquid nitrogen can provide a liquid cooling capability for advanced electronics as well as low temperature environments that would enable high efficiency alternators and motors along with other superconductor benefits giving massive weight and size benefits.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:
1. An on-board aircraft system, comprising:
  a first heat exchanger configured to receive pressurized air from a source of pressurized air, wherein the first heat exchanger cools the pressurized air to a temperature in the range of −120° C. to −70° C.; and
  a separation unit configured and dimensioned to communicate with the first heat exchanger and to generate nitrogen enriched air from the cooled air at the temperature range of −120° C. and −70° C.
2. The system of claim 1, further comprising:
  a second heat exchanger coupled to the separation unit to liquefy at least a portion of the generated nitrogen enriched air by cooling the portion of the generated nitrogen enriched air to a temperature in the range of −210° C. to −195° C.; and
  a nitrogen storage container to store the liquefied portion of the nitrogen enriched air.
3. The system of claim 2, wherein the first heat exchanger and the second heat exchanger comprise one of a liquid helium heat exchanger and a neon heat exchanger.
4. The system of claim 1, wherein the source of pressurized air is disposed between the first heat exchanger and an air supply source to generate the pressurized air from air supplied from the air supply source, wherein the air supply source is selected from the group consisting of cabin air, bleed air and ram air.
5. The system of claim 1, wherein the separation unit comprises at least two separation membranes, wherein one of the at least two separation membranes binds byproducts and lets nitrogen pass to generate the nitrogen enriched air, while the other separation membrane of the at least two separation membranes uses the cooled air to purge the byproducts.
6. The system of claim 5, further comprising:
  a sensor coupled to the separation unit, wherein the sensor measures oxygen content in the generated nitrogen enriched air and when said oxygen content raises above a predetermined threshold value, reverses operation of the at least two separation membranes.
7. The system of claim 6, wherein the at least two separation membranes comprise one of low temperature ceramic separation membranes, gas chromatographic separation membranes, perovskite separation membranes, and zeolite separation membranes.
8. A method for on-board generation of nitrogen enriched air in an aircraft, comprising:
  feeding pressurized air into a first heat exchanger to cool the pressurized air to a temperature in the range of −120° C. to −70° C.; and
  feeding the cooled air at the temperature range of −120° C. and −70° C. into a separation unit and generating nitrogen enriched air from the cooled air.

9. The method of claim 8, further comprising:
liquefying at least a portion of the generated nitrogen enriched air by cooling the portion of the generated nitrogen enriched air to a temperature in the range of −210° C. to −195° C. in a second heat exchanger; and
storing the liquefied portion of the nitrogen enriched air in a nitrogen storage container.

10. The method of claim 9, wherein the first heat exchanger and the second heat exchanger comprise one of a liquid helium heat exchanger and a neon heat exchanger.

11. The method of claim 8, wherein the pressurized air is generated from air supplied from an air supply source, and wherein the air supply source is selected from the group consisting of cabin air, bleed air and ram air.

12. The method of claim 8, wherein the separation unit comprises at least two separation membranes.

13. The method of claim 12, wherein generating the nitrogen enriched air from the cooled air comprises:
binding byproducts and letting nitrogen pass in one of the at least two separation membranes to generate the nitrogen enriched air, while purging the byproducts using the cooled air in other separation membrane of the at least two separation membranes.

14. The method of claim 13, further comprising:
measuring oxygen content in the generated nitrogen enriched air using a sensor and reversing operation of the at least two separation membranes when said oxygen content raises above a predetermined threshold value.

15. The method of claim 14, wherein the at least two separation membranes comprise one of low temperature ceramic separation membranes, gas chromatographic separation membranes, perovskite separation membranes, and zeolite separation membranes.

* * * * *